Oct. 6, 1970  G. E. MILTON ET AL  3,532,967
TESTING DEVICE FOR CIRCUIT BREAKERS AND ELECTRICAL
COMPONENTS ASSOCIATED THEREWITH
Filed Jan. 23, 1968

INVENTORS
GERALD E. MILTON
WILLIAM F. MULLIN
BY Robert F Meyer
ATTORNEY

United States Patent Office 3,532,967
Patented Oct. 6, 1970

3,532,967
TESTING DEVICE FOR CIRCUIT BREAKERS AND ELECTRICAL COMPONENTS ASSOCIATED THEREWITH
Gerald E. Milton, Indianapolis, Ind., and William F. Mullin, New Providence, N.J., assignors to P. R. Mallory & Co. Inc., Indianapolis, Ind., a corporation of Delaware
Filed Jan. 23, 1968, Ser. No. 699,955
Int. Cl. G01r 31/02
U.S. Cl. 324—28
7 Claims

ABSTRACT OF THE DISCLOSURE

An SCR phase control arrangement which is electrically connected in series with a resistance element to test circuit breakers and by electrically switching from the SCR circuit to another circuit, the current drawn by the various electrical elements associated with the circuit breaker can be readily checked through a current measuring device such as an ammeter.

Figure 1:
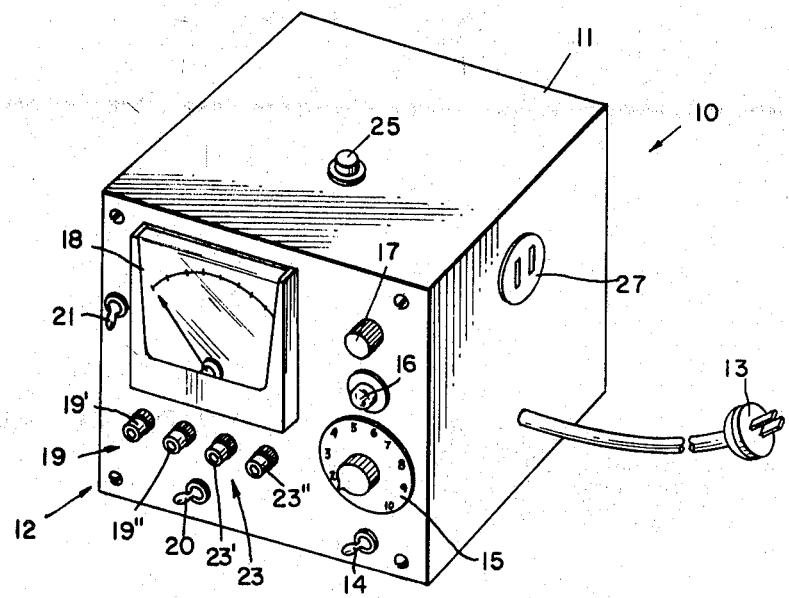

Resettable circuit breakers are used in several of the presently available home entertainment units such as television sets (monochrome and color), radios, phonographs, and the like. The circuit breakers are used to provide positive circuit protection from momentary circuit overload yet will allow resetting by the set owner in case of such overload.

The circuit breakers present a service problem because a great number of service technicians are unaware of the exact characteristics of the devices. For example, a breaker might open for no apparent reason. In such a case a check of components in a television set might reveal nothing of a particularly serious nature which could cause the breaker to open. The first tendency of the technician would be to suspect the breaker. This leads to servicing problems since in most cases he is not really familiar with the breaker and further, rarely does a technician possess the test equipment required to accurately check the breaker. The real tragedy of the situation is the tendency of far too many technicians to substitute a new breaker of a higher rating. While this solves his immediate problem, it creates a potentially serious hazard for the set owner since his set no longer has the proper protection against electrical overload.

This entire situation has led to the present development of a unique testing device which quickly and accurately checks the current drawn by electronic equipment and, at the same time, enables the technician to check the circuit breaker for proper "make" and "break" performance.

An added feature to the tester described is the inclusion of a standard convenience outlet so the technician may plug in any AC operated device (drill, soldering iron or gun, light, etc.) drawing up to the rated current of the device. The tester control can be adjusted to vary the voltage applied to the device. The breaker testing circuit can be by-passed when this operation takes place.

It is, therefore, an object of the present invention to provide a tester which quickly enables a circuit breaker to be tested to see if it opens at its rated "break rating."

Another object of the invention is to provide a tester which quickly and accurately checks the current drawn by the various components of an appliance.

Still another object of the invention is the provision of a tester having at least one standard convenience outlet so that a technician can plug in an AC operated device such as a drill.

Another object of the invention is the provision of a tester for circuit breakers which utilizes an SCR control circuit.

Yet another object of the invention is the provision of a tester for circuit breakers which utilizes a high ohm resistor in conjunction with the SCR control circuit.

With the above and other objects in view, which will appear as the description proceeds, this invention resides in a novel testing device which is suitable for testing circuit breakers substantially as described herein and more particularly defined by the appended claims, it being understood that various changes in the precise embodiment of the invention here disclosed may be made without departing from the spirit thereof.

Figure 2:
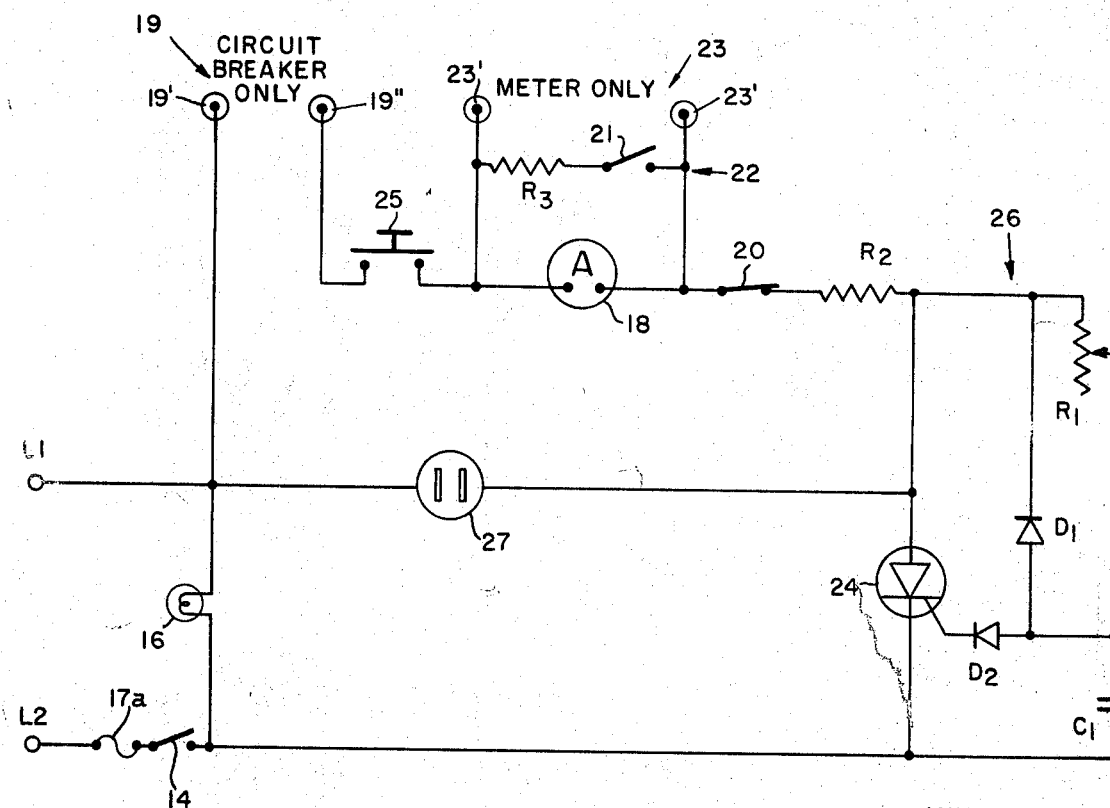

In the drawings:
FIG. 1 is a perspective view of the tester unit showing its control panel; and
FIG. 2 is a circuit diagram showing the various electrical elements of the tester.

Generally speaking, the objects of the invention are accomplished by providing an SCR phase control arrangement which is electrically connected in series with an impedance unit such as a resistance element having a high power rating. The circuit breaker is placed in series with the element along with an AC ammeter in series with the resistance element. By electrically switching from the SCR circuit to another circuit through the ammeter, the current drawn by the various elements of the appliance can be readily checked through the ammeter. At least one standard convenience outlet is also included as part of the complete circuit so that any AC operated device drawing up to the rated current of the tester can be operated and controlled by the tester.

More specifically, the tester of the present invention utilizes an electrical circuit to perform at least two separate testing functions: (1) it utilizes the voltage of the tester to test the circuit breaker; and (2) it utilizes the voltage and current of the appliance to test the voltage operation of the appliance with the circuit breaker being by-passed. In the latter case the SCR phase control circuit is not used.

Referring now to the drawings, there is shown a tester 10, the components of which are contained within a box 11. The front face of the box consists of a panel 12 having various control dials and indicators. The tester can be plugged into any suitable outlet through male plug 13 so as to generate a voltage between lines $L_1$, $L_2$. As shown, the panel of the box carries an ON-Off switch 14, a control dial 15 for adjusting the carrying current through the variable resistor $R_1$, a light 16 to indicate that the tester is turned on, a socket 17 for holding a fuse 17a, an ammeter 18, a plurality of sockets 19 and 23 for receiving electrical leads, a switch 20 for electrically connecting the desired sockets 19 and 23 into the electrical circuit, and a switch 21 for closing the meter shunt circuit 22.

The operation of the tester can best be explained by way of example of an actual test conducted on an appliance such as a television set.

The testing of the circuit breaker is first accomplished in the following manner. After gaining access to the circuit breaker one wire is removed from the breaker. With the tester leads (not shown) in "circuit breaker only," that is sockets 19′ and 19″, the tester leads are attached to the circuit breaker terminals. Switch 20 is closed by switching its knob toward the sockets 19′ and 19″. After consulting the television set's specifications to determine the proper load carrying current of the breaker and its proper breaking current, the tester is turned on through switch 14, and the unit adjusted for such current rating through control dial 15, the setting of the dial determining the magnitude of variable resistor $R_1$. Depending upon the rating of the circuit breaker, switch 21 can be opened (7.5 amps, for example) or closed (5 amps, for example) to close the shunt circuit 22, having meter shunt resistor $R_3$, for the ammeter 18.

With the tester leads in the "circuit breaker only" position, and the set turned on to close switch 14, the current will flow through an electrical switching means such as SCR 24, and resistor $R_2$ when safety interlock switch 25 is depressed to close the circuit. An SCR phase control circuit 26 is connected across SCR 24 to control the gate turn on time, and consequently the current, and the voltage through the SCR. Phase control circuit 26 includes variable resistor $R_1$ connected to capacitor $C_1$, which controls the charge to the capacitor. Diode $D_1$ is connected across resistor $R_1$ to prevent reverse charging of the capacitor $C_1$ while diode $D_2$ is connected across the gate of the SCR and capacitor $C_1$ to prevent incorrect polarity impulses to the SCR.

With the current thus flowing, and with the tester adjusted to the proper carrying current, the breaker must remain closed. If it opens the breaker is at fault. Assuming the breaker meets current carrying specifications, the tester can now be adjusted slowly toward the "break" rating. The breaker must open at the rated "break" current within about 180 seconds. Usually much less time is required.

An important element of the "circuit breaker only" circuit is the resistor $R_2$. Without it the SCR circuit could not withstand the surge of current with the tester being connected directly across the television circuit breaker. Resistor $R_2$ should of necessity be of a high wattage value or, to put it another way, a high resistance value—say at least 10 ohms. And it needs to be contained within a relatively small testing unit. The present invention utilizes a coil (not shown) fabricated of Nichrome sandwiched between a suitable thermal insulation material such as asbestos.

The use of the SCR circuit in conjunction with resistor $R_2$ enables the testing unit to be small and compact and to deliver maximum power. Thus, for example, if one were to use a rheostat to control the current through the breaker, the rheostat would have to dissipate power in excess of 800 watts. This would normally require a relatively large rheostat (at least 8 in. in diameter). Such a rheostat, in combination with the other elements needed in the tester, would make for a large and bulky testing unit.

If the breaker performs properly, the components of the television set may now be checked. Such testing is done with the breaker out of the circuit. In this instance the television set is used as the power source. The tester leads (not shown) are removed from the circuit "breaker only" position and inserted in the "meter only" sockets, 23' and 23''. Switch 20 is changed to the "meter only" setting, thus opening the switch so as to switch from the SCR circuit to the ammeter circuit. Again, switch 21 is actuated according to the need of the shunt circuit 22 in accordance with the current rating of the set. With one tester lead remaining attached to the breaker, the other lead is clipped or otherwise attached to the wire previously removed from the breaker. With the current flowing through the ammeter 18 and, if necessary, the shunt circuit 22, the current drawn by the portion of the set circuitry protected by the breaker is precisely measured. If this current is within specified limits, the set is operating properly. If, on the other hand, the set draws more current than specified, the offending component(s) must be located and repaired or replaced.

As an additional feature, the present invention provides for at least one standard convenience outlet so that any AC operated device such as a drill, soldering iron, or the like, drawing current up to the rating of the tester may be operated. As shown outlet 27 is connected between the anode of the SCR and terminal $L_1$ of the power source. The ammeter 18 and resistor $R_2$ is by-passed by opening switch 20 when the outlet is used. The tester control 15 which adjusts variable resistor $R_1$ can be adjusted to vary the voltage applied to the device being operated.

In summation, the tester of the present invention provides for a quick and reliable method of checking circuit breakers as well as operation of the appliance being checked. In addition the tester provides a means for operating standard technicians' equipment such as a drill, soldering iron or the like.

From the foregoing description, taken in conjunction with the accompanying figures of the drawing, it will be readily apparent to those skilled in the art that this invention provides a new and improved testing device.

What is claimed is:

1. In combination, an SCR circuit adapted to test circuit breakers and electrical element testing means for testing electrical elements associated with said circuit breakers including
   (a) means for connecting to a source of power, an SCR across said means for connecting, an SCR phase control circuit connected across the anode, cathode and gate of said SCR to control the current and voltage through said SCR, a high wattage current limiting resistor connected in series with the anode-cathode circuit of said SCR and said means for connecting to limit current surges through said SCR, first electrical terminals coupled in series between said means for connecting and said limiting resistor for receiving electrical leads from said circuit breaker so as to electrically connect said SCR circuit to said circuit breaker,
   (b) electrical element testing means including current measuring means connected between said limiting resistor and said first electrical terminals, said electrical terminals coupled across said current measuring means, and
   (c) switching means in series with said limiting resistor and coupled to said current measuring means for electrically isolating said SCR circuit from said electrical element testing means.

2. The combination according to claim 1 in which said SCR phase control circuit includes a variable resistor and a capacitor coupled in parallel to said SCR so as to control the voltage output of said SCR.

3. The combination according to claim 2 wherein said phase control circuit includes a first diode connected across said variable resistor to prevent reverse charging of said capacitor, and a second diode connected across the gate of said SCR and said capacitor to prevent incorrect polarity impulses to said SCR.

4. The combination according to claim 1 wherein said combination further includes at least one electrical outlet connected between said power source and said SCR.

5. The combination according to claim 1 wherein said circuit includes a push button adapted to intermittently open and close said circuit.

6. The combination according to claim 1 wherein said current measuring means is an ammeter.

7. The combination according to claim 6 in which a shunt circuit is connected across said ammeter.

References Cited

UNITED STATES PATENTS 2,947,937   8/1960   Ritcher et al. _____ 324—28

OTHER REFERENCES

G.E. SCR Manual (2nd Edition), December 1961, pp. 60–61.

RUDOLPH V. ROLINEC, Primary Examiner

E. L. STOLARUN, Assistant Examiner

U.S. Cl. X.R.

323—22, 36; 324—158